UNITED STATES PATENT OFFICE.

VICTOR PERELZVEICH AND GUSTAV ROSENBUSCH, OF ZURICH, SWITZERLAND.

SOLIDIFIED ALCOHOL AND PROCESS OF MAKING THE SAME.

No. 919,759.  Specification of Letters Patent.  Patented April 27, 1909.

Application filed December 7, 1908. Serial No. 466,371.

*To all whom it may concern:*

Be it known that we, VICTOR PERELZVEICH, chemist, a citizen of the Russian Empire, residing at Zurich, IV Clausiusstr. 38, in the Republic of Switzerland, and GUSTAV ROSENBUSCH, manufacturer, a citizen of the German Empire, residing at Zurich, IV Sonneggstr. 76, in the Republic of Switzerland, have invented new and useful Improvements in Solidified Alcohol and Processes of Making the Same, of which the following is a specification.

Recently various preparations and mixtures have been produced, which, added to alcohol, have the effect of solidifying the alcohol or of setting the same to a more or less hard mass. Some of these preparations or mixtures have the disadvantage, however, that they decrease the calorific value of the alcohol, while others, during the combustion of the mass, leave such large quantities of residue that the continuous burning of the mass is interfered with; other preparations have a tendency to become liquefied when burning or else are liable to explosion when ignited.

We have now succeeded in producing a solid alcohol which has none of the disadvantages enumerated, and according to our invention we use the synthetically produced tristearin as the solidifying agent; this substance is a neutral fat which surpasses in many respects the stearin of commerce, the latter being much admixed with impurities consisting of the higher members of the fatty acid series, and it has certain advantages over all solidifying agents hitherto known. The tristearin is produced by heating glycerin and stearic acid for a considerable time to a high temperature, whereby at first monostearin and finally tristearin is formed, this being a neutral fat but not in its pure state being admixed with fatty acids. The synthetical production of this compound is described in Dr. Beilstein's *Handbuch der. org. Chemie*, 2nd edition, 1886, Hamburg, Leipzig, I, p. 421—; also in Hollemann, *Lehrbuch der org. Chemie*, Leipzig, 1899, p. 171.

As an example of the manner in which our process is effected, we preferably use denatured alcohol and to a quantity of this liquid we add a mixture consisting of about 3% tristearin and about 5% sodium sebate; the whole is then heated for a short time. After the mixture has dissolved, an alcoholic ethereal solution of about 1% of tetra-nitrate of cellulose is added; after a short space of time the latter ingredient is dissolved and the whole mass assumes the solid state. The output of solid alcohol corresponds in quantity to the amount of liquid alcohol used at the beginning of the process. The solid mass thus produced, gives, when ignited, a flame of intense heat; it melts very slowly, solidifies quickly, and leaves but little residue after ignition and at the same time all danger of explosion is obviated.

We may vary the proportions of the constituents of the solidifying agent without departing from the principle of the invention.

Having thus described our invention what we claim is:

1. The herein described process of producing solid alcohol, which consists in mixing alcohol with tristearin, sodium sebate, and tetra-nitrate of cellulose.

2. The herein described process for producing solid alcohol, which consists in adding to denatured alcohol a solidifying agent formed of about 3% of tristearin, about 5% of sodium sebate, and about 1% of tetra-nitrate of cellulose, substantially as described.

3. The herein described process of producing alcohol in the solid state, which consists in adding to denatured alcohol about 3% of tristearin and about 5% of sodium sebate, heating the mixture so obtained and then adding to the dissolved mixture about 1% of tetra-nitrate of cellulose in alcoholic ethereal solution, substantially as described.

4. As an article of manufacture, the herein described solid alcohol, consisting of a mixture of denatured alcohol, tristearin, sodium sebate and tetra-nitrate of cellulose, substantially as described.

5. As a new article of manufacture, the herein described solid alcohol, consisting of an alcoholic solution of about 3% tristearin, about 5% sodium sebate and about 1% tetra-nitrate of cellulose, substantially as described.

In testimony whereof we affix our signatures in presence of two witnesses.

VICTOR PERELZVEICH.
GUSTAV ROSENBUSCH.

Witnesses:
M. SCHUMANN,
JOSEPH SIMON.